(12) United States Patent
Leppin et al.

(10) Patent No.: US 7,811,544 B1
(45) Date of Patent: Oct. 12, 2010

(54) SULFUR RECOVERY PROCESS

(75) Inventors: Dennis Leppin, Chicago, IL (US); Howard S. Meyer, Hoffman Estates, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 12/547,525

(22) Filed: Aug. 26, 2009

(51) Int. Cl.
 *B01J 10/00* (2006.01)
 *C01B 17/05* (2006.01)
(52) U.S. Cl. ............. 423/573.1; 423/574.1; 423/576.2; 422/129; 422/187; 422/188
(58) Field of Classification Search ............. 423/573.1, 423/574.1, 576.2; 422/129, 187, 188
 See application file for complete search history.

(56) References Cited

U.S. PATENT DOCUMENTS

| | | | |
|---|---|---|---|
| 6,495,117 B1 | 12/2002 | Lynn | |
| 6,645,459 B2 | 11/2003 | Lynn | |
| 7,381,393 B2 | 6/2008 | Lynn | |
| 2003/0082096 A1 * | 5/2003 | Lynn | ....................... 423/574.1 |

* cited by examiner

*Primary Examiner*—Timothy C Vanoy
(74) *Attorney, Agent, or Firm*—Mark E. Fejer

(57) ABSTRACT

A method for recovering sulfur from a sulfur-bearing process gas stream in which a process gas stream comprising $H_2S$ and/or $SO_2$ is contacted with a lean mixture of a lean UCSRP solution and a catalyst for promotion of a reaction between $H_2S$ and $SO_2$ in a non-UCSRP vessel at a temperature below which $H_2S$ and $SO_2$ react, whereby at least a portion of the $H_2S$ and/or $SO_2$ is absorbed by the lean UCSRP solution, forming a rich mixture of a rich UCSRP solution and the catalyst. The rich mixture is introduced into a UCSRP vessel and heated to a reaction temperature greater than or equal to a melting temperature of sulfur, forming elemental sulfur and $H_2O$.

12 Claims, 2 Drawing Sheets

SULFUR RECOVERY PROCESS

BACKGROUND OF THE INVENTION

1. Field of the Invention

This invention relates to a method and system for recovering sulfur from sulfur-containing gaseous streams. In one aspect, this invention relates to a method and system for directly treating sour, contaminated gas streams. In one aspect, this invention relates to a method and system for treating amine offgas streams.

2. Description of Related Art

Conventional technology for removing $H_2S$ from natural gas and hydrocarbon process gas streams is to contact the process gas stream in a suitable mass transfer contacting device, usually a vessel fitted out with packing or contactor trays, for example valve trays with an amine solution at a specified strength of amine in water, usually 50% or less amine by weight, but dependent on the specific amine employed. Such amines absorb acidic gases, $CO_2$, and $H_2S$, and similar acidic components, although these are the acidic components usually found in significant concentrations, and forms a chemically bonded solution referred to as a rich or loaded amine. The rich or loaded amine is sent to be "stripped" or regenerated, usually by the application of heat from direct injection of steam into a second, separate amine contactor often referred to as the regenerator, stripper, or reboiler, but also by indirectly heating the rich solution in the reboiler. Inert gases or gases not containing acidic components, such as nitrogen, may also be added to such strippers to promote the dissociation of the chemically bonded acidic components or allow the reactions to occur at lower temperatures. Vacuum may also be applied. After sufficient exposure to conditions in the stripper, the now lean solution is cooled, usually by cross exchange with the feed to the stripper so as to minimize the required heat duty of the overall system. The lean amine is then returned to the absorber. The offgases from the stripper are sent to a sulfur recovery unit, most often a Claus plant in which some of the gas is burned with air to create approximately 2:1 $H_2S/SO_2$ ratio in the gas at a temperature above 2500° F., resulting in the reaction $2H_2S+SO_2=3S+2H_2O$ occurring in the gas phase. The gas is then cooled, resulting in separation of up to about 70% of the sulfur in the feed as elemental sulfur in the liquid phase. The gas is reheated and passed over a catalyst at 600° F. or thereabouts, resulting in the formation of additional elemental sulfur. The gas is then cooled again, resulting in further elemental sulfur recovery. This is repeated in a total of 3 or 4 such catalytic Claus reactors until about 97% of the sulfur has been removed. Further removal is limited by equilibrium and if additional sulfur needs to be removed, all of the sulfur containing compounds are converted to $H_2S$ over a catalyst with added $H_2$-rich gas, further treated with a special amine to remove the $H_2S$ preferentially to other gases present, and such $H_2S$-rich gas is recycled to the Claus process. By such means, in excess of 99% of the sulfur can be removed. The steps subsequent to the Claus reactors and condensers are referred to as off gas treating processes and "tail gas" treating processes. Various enhancements to these processes exist to achieve even higher recoveries when required. For smaller tonnages of sulfur in the feed gas, on the order of 20 tons per day or less, liquid redox processes such as LO-CAT or Stretford, or the CrystaSulf process, may instead be employed more economically. For even smaller tonnages on the order of 100 lbs/day or less, absorbent beds of iron containing materials or caustic impregnated carbon or zinc oxide, or liquid filled beds of triazine "scavengers" or other chemicals or caustic may be used at lower system cost than the liquid redox type processes.

When various streams need to be treated separately to achieve varying sulfur removals, for example if such streams are needed in a complex process, separate amine absorbers may be used to achieve the varying requirements and at various operating pressures, temperatures, and flowrates, but if desired, and for cost efficiency, the rich amine resulting from such absorbers can be commingled and brought to a common regenerator for removal of the absorbed components. Such common removed offgases or acid gases can then be sent to a common sulfur recovery unit, again for economy and cost efficiency reasons. For example, the maximum size of a Claus sulfur recovery unit is on the order of 3000 tons per day of sulfur. This commingling of streams to a common Claus unit takes advantage of well known economy of scale principles. The same principles apply to the desire to use a common regenerator for the amine streams.

The University of California Sulfur Recovery Process, hereinafter referred to as the UCSRP, either directly treats sour, contaminated gas streams (referred to herein as UCSRP-HP (high pressure)) or amine offgas (referred to herein as UCSRP-LP (low pressure)) or similar gas in a reactor/contactor vessel at conditions where the reaction of $2H_2S+SO_2=3S+2H_2O$ takes place in the presence of a catalyst at temperatures above the melting point of sulfur. See, for example, U.S. Pat. No. 6,645,459, U.S. Pat. No. 6,495,117, and U.S. Pat. No. 7,281,393. The process is a solvent-based process for reacting excess $H_2S$ and $SO_2$ in a liquid-phase reactor vessel containing a mixture of an organic solution, referred to herein as an "UCSRP solvent" or "UCSRP solution", and a catalyst which catalyzes the reaction at a temperature above the melting point of sulfur. UCSRP solvents are physical solvents of moderate to low viscosity which are chemically inert to the reactants, products or other components with which they come in contact. UCSRP solvents readily absorb $H_2S$ and $SO_2$, preferably do not form an azeotrope with water, are chemically inert to the reactants, liquid sulfur and water, and have limited mutual solubility with liquid sulfur. Preferred UCSRP solvents are those derived from ethylene oxide or propylene oxide by a ring-opening reaction with a co-reactant having an active hydrogen, provided that the resulting solvent is inert with respect to both sulfur and $SO_2$. Typical of such solvents are the polyglycol monoethers and many diethers of both ethylene and propylene glycol. Examples are glycols and glycol ethers derived from ethylene oxide or propylene oxide, particularly ethers of ethylene glycol, diethylene glycol, triethylene glycol, tetraethylene glycol, propylene glycol, dipropylene glycol, tripropylene glycol, and tetrapropylene glycol. Specific examples are monomethyl, dimethyl, monoethyl, and diethyl ethers of these glycols. Additional UCSRP solvents are various trialkyl and alkyldialkanol amines, such as triethyl amine and methyl diethanol amine, and liquid alkyl and aryl quaternary ammonium salts. Preferred catalysts for use in the UCSRP are tertiary amines, particularly lower alkyl-substituted tertiary amines, and aryl-substituted tertiary amines, including those in which the amine nitrogen is an aromatic ring atom.

Conventional processes for removing $H_2S$ and other sulfur-containing gases, e.g. COS, $SO_2$, and other gases from process streams containing such gases in chemical plants, heavy oil upgrade (tar sands) facilities, refineries, and coal gasification and similar facilities while simultaneously converting the removed sulfur-containing gases to elemental sulfur are significant capital and operating cost components of such plants. Application of the UCSRP may be advantageous by reducing the capital and operating costs for $H_2S$ and other sulfur compound removal and conversion to elemental sulfur, as compared with other available technologies such as amine plus Claus plus off gas treating. Published studies show cost savings up to 40% in capital and operating costs for replacing only the Claus and off gas treating processes.

Benefits of using the UCSRP are exemplified in syncrude upgrading processes such as are practiced in oil sands deposits in various parts of the world in which various hydrotreating processes, as shown in FIG. 1, are employed on crude fractions resulting from the distillation of raw syncrude such as gas oil, diesel, and naphtha fractions. The offgases of hydrotreating operation 10 contain significant amounts of $H_2S$ and unconverted $H_2$ and it is required to recycle the unconverted $H_2$. This offgas is typically processed in an amine absorber 11 for the removal of $H_2S$ and is located in the hydrotreating process area. The rich amine resulting from the hydrotreating of several different crude fractions is sent to a common amine regenerator 12 located in the acid gas process area, and the amine offgases (acid gas) from such amine regenerator is then sent to conventional sulfur recovery units 13 such as Claus plants with tail gas treating as necessary as well as other technologies for acid gas sulfur recovery known to those skilled in the art. The UCSRP can eliminate the need for such regenerator and sulfur recovery/tail gas treating steps by replacing these process steps with the steps of the UCSRP, and even greater savings may be realized by substitution of the amine plant and regenerator with the UCSRP. Although using the UCSRP is straightforward when the gas stream undergoing processing is treated directly, such is not the case with other streams. For example, an amine plant may preferentially be used to treat one or more streams to specification where use of the UCSRP for direct treatment of the stream(s) would not be able to meet process specifications due, for example, to incompatibility of the process stream with the required temperature of the UCSRP or the high vapor pressure of the solvent used in the UCSRP, or because other components not removed by the UCSRP are desired to be removed simultaneously with the acidic $H_2S$ and other sulfur compounds, unacceptable co-absorption of higher hydrocarbons, and for other reasons known to those skilled in the art. In that event, the acid gas from the regeneration of the amine would be available to the UCSRP, but this does not afford the opportunity for additional savings of applying the UCSRP to a high-pressure process stream directly, which use enables eliminating the amine plant and the associated regenerator, and the associated high process steam demand for the regenerator, and at little incremental cost to the UCSRP applied solely to the amine acid gas offgas.

SUMMARY OF THE INVENTION

It is, thus, one object of this invention to provide a method for removing sulfur from sulfur-containing process gas streams which are incompatible with direct processing in a conventional UCSRP.

It is one object of this invention to provide a method using a UCSRP solution for removal of sulfur from sulfur-containing process gas streams which are incompatible with direct processing in a conventional UCSRP.

These and other objects of this invention are addressed by a method for recovering sulfur from a sulfur-bearing process gas stream in which a process gas stream comprising $H_2S$ and/or $SO_2$ is contacted with a lean mixture comprising a lean UCSRP solution and a catalyst for promotion of the reaction between $H_2S$ and $SO_2$ at a temperature below which $H_2S$ and $SO_2$ react, whereby at least a portion of the $H_2S$ and/or $SO_2$ is absorbed by the lean UCSRP solution, forming a rich mixture comprising a rich UCSRP solution and said catalyst. The rich UCSRP solution together with the catalyst, i.e. the rich mixture, is introduced into a UCSRP vessel and heated to a reaction temperature greater than or equal to a melting temperature of sulfur, forming elemental sulfur and $H_2O$. The invention is particularly suitable for use in situations where the absorption of $H_2S$ (or $SO_2$) is required to be carried out in the process gas stream producing process area at a location elsewhere than the UCSRP vessel. In accordance with one embodiment, the lean mixture from the UCSRP vessel is transferred to the process area for absorption of $H_2S$ or $SO_2$ after cooling as necessary to allow sufficient solvent capacity and to reduce the potential of undesired reactions outside of the UCSRP vessel. In accordance with one embodiment, the concentration of one or the other or both of the $H_2S$ and $SO_2$ is reduced to low levels irrespective of the temperature and the opposite number $H_2S$ or $SO_2$ is absorbed without the above cited reaction between $H_2S$ and $SO_2$ occurring. The rich UCSRP solution resulting from the contact with the $H_2S$ and/or $SO_2$ is conveyed to the UCSRP vessel and then heated up to the desired operating temperature above the melting point (247° F.) and below the polymerization temperature (310° F.) of elemental sulfur. $H_2S$ (or $SO_2$) absorbed in the solution, which is a "physical solvent", evolves as the solution is heated up and/or possibly reduced in pressure; but by feeding the flashed solution at a point in the UCSRP vessel below the upper level of the packing or at an intermediate tray for trayed contactors, the liberated $H_2S/SO_2$ can be reabsorbed since the concentration of $H_2S/SO_2$ in the solution is being continually reduced by the above reaction, thus affording capacity for such reabsorption despite the higher temperature of the solvent which would otherwise inhibit the capacity to absorb these components.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Terminology

Figure 1:
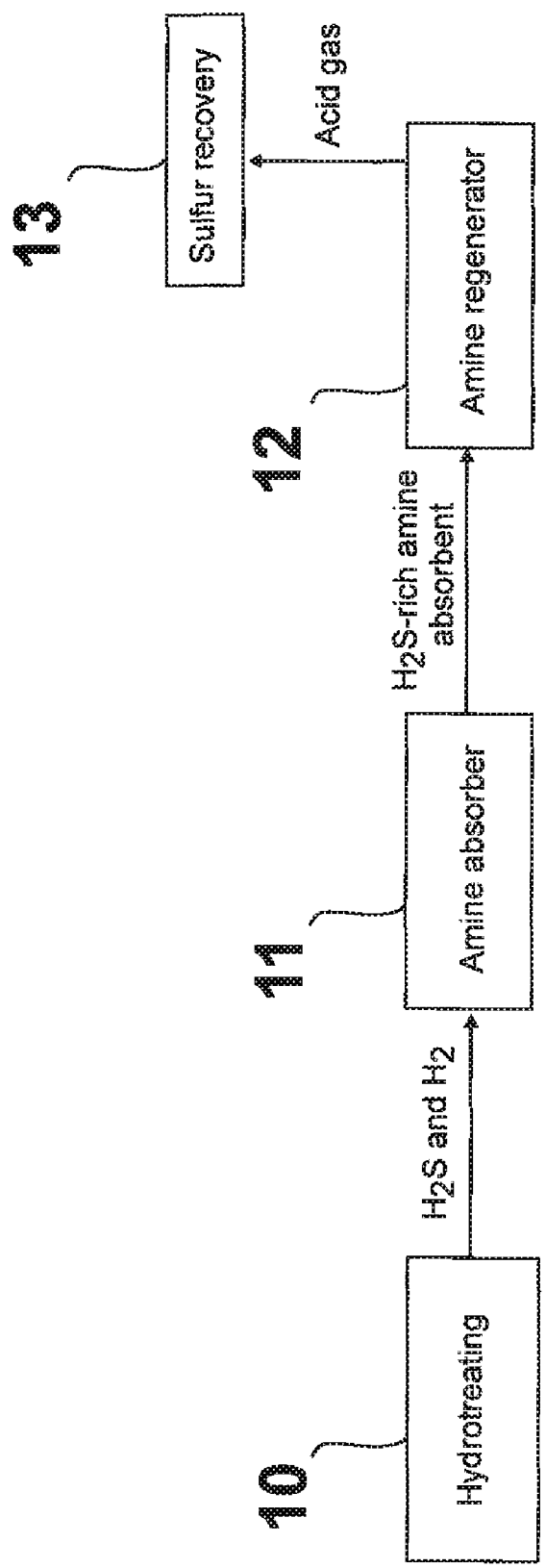
FIG. 1 is a schematic diagram of a conventional process for recovery of sulfur from a hydrotreating process offgas.

It will be understood by those skilled in the art that the terms "lean" and "rich" when used to define the status of the UCSRP solution in the method of this invention correspond to the use of those terms in connection with conventional absorption/stripping processes and, thus, are generally not representable by precise numerical values. In conventional absorption/stripping processes, the solution coming out of the stripper, which is substantially free of the main contaminant, is referred to as being "lean", and the solution coming out of the absorber, which is enriched in the component or components of interest for which the solution has a propensity, is referred to as being "rich". Thus, in accordance with the method of this invention, a lean UCSRP solution is a UCSRP solution which has absorbed $H_2S$ and $SO_2$ in the proper ratio in accordance with the method and which has been exposed to reaction conditions, sufficient temperature and pressure to allow the sulfur to form, and further has undergone separation of the immiscible sulfur layer by mechanical means. As long as this "lean" UCSRP solution has not then been allowed to absorb any additional $H_2S$ or $SO_2$, it remains "lean". It can then absorb either $H_2S$ or $SO_2$ at low temperatures in accordance with the method of this invention without any reaction occurring.

As used herein, the term "UCSRP vessel" refers to a vessel in which the UCSRP is being carried out. Thus, as used herein, the term "non-UCSRP vessel" refers to a vessel operating at conditions unsuitable for carrying out the UCSRP.

This invention is a method for removing $H_2S$ and other sulfur-containing gases, such as COS, $SO_2$ and other gases, from process gas streams containing such gases in chemical plants, heavy oil upgrade facilities, refineries, coal gasification plants and similar facilities while simultaneously converting the sulfur in the removed sulfur-containing gases to elemental sulfur. The method involves contacting the sulfur-containing process gas stream with a lean UCSRP solution at a temperature below the melting temperature of elemental sulfur. The lean UCSRP solution is suitable for absorbing $H_2S$ and/or $SO_2$ since it has a high solubility for these components. As a physical solvent, the lean UCSRP solution, when used in accordance with the method of this invention, works preferably at high partial pressures, greater than about 3 bar of $H_2S$ and $SO_2$, and relatively low temperatures, the latter condition enhancing the absorption capacity of the physical solvent. The $H_2S$ removal from hydrotreating offgases is typically at high pressures, in the range of about 60 bar, with $H_2S$ concentrations, in the range of about 12% and modest temperatures, i.e. less than about 105° F., so a physical solvent, although not necessarily optimal for the recycle gas absorption step alone, nevertheless produces an optimal overall treating and sulfur recovery approach. In accordance with one embodiment of this invention, cleanup of hydrotreater offgas is carried out by contact with a lean UCSRP solution at a temperature less than about 120° F. In accordance with one preferred embodiment of this invention, the temperature of the lean UCSRP solution is in the range of about 0° F. to about 100° F., resulting in removal of 99+% of the $H_2S$ in the offgas. In accordance with one embodiment of this invention, a single stream of solvent may be directed at one or more hydrotreating operations and the resulting rich UCSRP solutions combined for processing in a UCSRP vessel. In accordance with another embodiment of this invention, the rich UCSRP streams are maintained as separate streams. For example, one or more of the hydrotreating offgas streams may be at conditions such that a physical solvent may not be practically able to remove the $H_2S$ and other sulfur compounds desired to be removed to the desired degree or with a reasonable set of operating conditions, such as solvent circulation rate or absorber column size, provided at least one hydrotreating offgas stream is suitable for $H_2S$ and other sulfur compound removal using the UCSRP solvent formulation, i.e. a solvent which without further modification is suitable for use in the UCSRP provided it is heated up to the required temperature, i.e. in the range of about 247° F. to about 310° F. The lean UCSRP solution is mixed with a small amount of homogeneous catalyst, typically less than about 1% by weight, for carrying out the reactions in the UCSRP vessel, provided such catalyst is not effective for carrying out the reactions of the UCSRP when at the range of temperatures contemplated by the present invention, i.e. 0° F. to about 120° F. Lower temperatures in accordance with one embodiment of this invention may be employed, but are usually not considered due to the requirements for relatively expensive refrigeration such as can be produced by propane vapor compression refrigeration cycles. Higher temperatures, approaching the melting temperature of sulfur, will allow the included catalyst to react with the dissolved $H_2S$ and $SO_2$, if present. In the event that one or the other of $H_2S$ and $SO_2$ is not simultaneously present in the rich UCSRP solution, any temperature may be utilized in the method of this invention, but higher temperatures are generally disadvantageous for absorbing $H_2S$ and $SO_2$ as required in the non-UCSRP portion of the process of this invention. It will also be appreciated that, in the event that only one of $H_2S$ and $SO_2$ is present in the rich UCSRP solution, it will be necessary to provide a stream containing the other of the $H_2S$ and $SO_2$ to the UCSRP vessel in an amount sufficient to provide a stoichiometric balance of about twice as much $H_2S$ as $SO_2$ in the UCSRP vessel. Accordingly, in accordance with one embodiment of this invention, the lean UCSRP solution is separated into a plurality of lean UCSRP solution streams, thereby enabling each of the streams to be directed to separate $H_2S$ and $SO_2$ sources. In accordance with one embodiment of this invention, excess $H_2S$ in the UCSRP vessel is directed to a furnace in which it is burned for generation of $SO_2$ for recycle to the UCSRP vessel.

Figure 2:
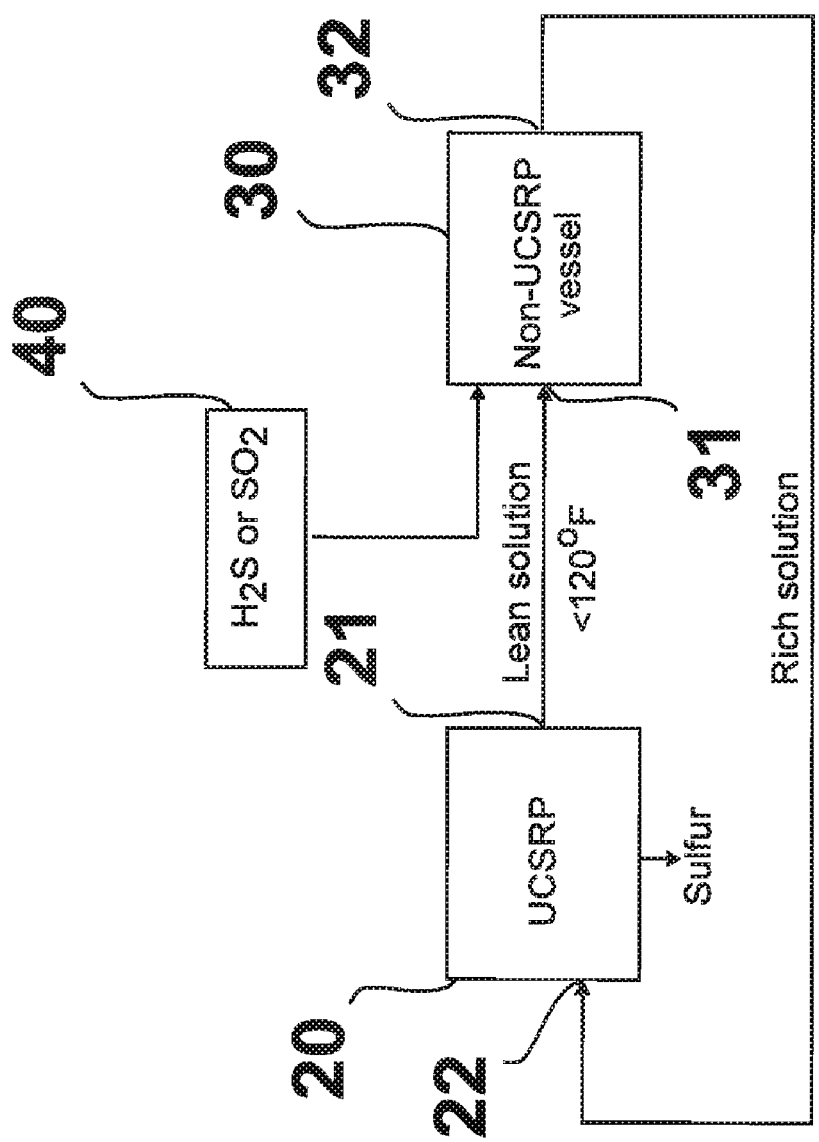
FIG. 2 is a schematic diagram of a system for sulfur recovery in accordance with one embodiment of the method of this invention.

FIG. 2 is a schematic diagram showing a system for carrying out the method of this invention. The system comprises a UCSRP vessel 20 having a lean mixture outlet 21, a non-UCSRP vessel 30 having a lean mixture inlet 31 in fluid communication with the lean mixture outlet and having a rich mixture outlet 32 in fluid communication with a rich mixture inlet 22 of UCSRP vessel 20, and a process gas source 40 for providing a process gas comprising at least one of $H_2S$ and $SO_2$ to the non-UCSRP vessel. Exemplary of a process gas source is a hydrotreating process.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for recovering sulfur from a sulfur-bearing stream comprising the steps of:
   contacting at least one process gas stream comprising at least one of $H_2S$ and $SO_2$ with a lean mixture comprising a lean UCSRP solution and a catalyst for promotion of a reaction between $H_2S$ and $SO_2$ at a temperature below which $H_2S$ and $SO_2$ react, forming a rich mixture comprising a rich UCSRP solution, said catalyst, and at least a portion of said at least one of said $H_2S$ and said $SO_2$, and
   introducing said rich mixture into a UCSRP vessel and heating said rich mixture to a reaction temperature greater than or equal to a melting temperature of sulfur, forming elemental sulfur and $H_2O$.

2. The method of claim 1, wherein a portion of said at least one of said $H_2S$ and said $SO_2$ in said rich mixture evolves as said rich mixture is heated, producing at least one of liberated $H_2S$ and liberated $SO_2$ and producing a reduced sulfur-containing mixture.

3. The method of claim 2, wherein a portion of said at least one of said liberated $H_2S$ and said liberated $SO_2$ is absorbed into said reduced sulfur-containing mixture.

4. The method of claim 1, wherein said temperature of said lean mixture is less than said melting temperature of sulfur.

5. The method of claim 1, wherein said process gas stream is produced by at least one of a chemical plant, a heavy oil upgrade facility, a petroleum refinery, and a gasification process.

6. The method of claim 5, wherein said process gas stream is a hydrotreating process offgas.

7. The method of claim 4, wherein said temperature is less than about 120° F.

8. The method of claim 1, wherein said process gas stream comprises additional sulfur-containing gases.

9. The method of claim 1, wherein said rich mixture is transformed into said lean mixture upon formation of said elemental sulfur and $H_2O$, and said lean mixture is used to contact said at least one process gas stream.

10. A system for removal of sulfur from a sulfur-bearing gas stream comprising:

a non-UCSRP vessel containing a lean mixture comprising a lean UCSRP solution and a catalyst for promotion of a reaction between $H_2S$ and $SO_2$ at a temperature less than a melting temperature of sulfur, said non-UCSRP vessel having a process gas stream inlet, a processed gas stream outlet, a lean mixture inlet in fluid communication with a lean mixture source, and a rich mixture outlet;

a UCSRP vessel containing a rich mixture comprising a rich UCSRP solution and said a catalyst for promotion of a reaction between $H_2S$ and $SO_2$ at a temperature greater than said melting temperature of sulfur, said UCSRP vessel having a rich mixture inlet in fluid communication with said rich mixture outlet; and a sulfur-containing process gas source in fluid communication with said process gas stream inlet for providing a sulfur-containing process gas stream to said non-UCSRP vessel.

11. The system of claim 10, wherein said process gas stream source is selected from the group consisting of chemical plants, heavy oil upgrade facilities, petroleum refineries, coal gasification plants, and combinations thereof.

12. The system of claim 11, wherein said process gas stream source is a hydrotreating process vessel.

* * * * *